Figure 1:
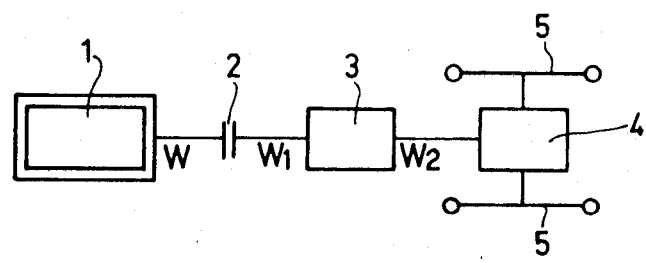

United States Patent [19]

Baudoin

[11] 4,397,379
[45] Aug. 9, 1983

[54] VEHICLE ENGINE CONTROL
[75] Inventor: Patrice Baudoin, Bougival, France
[73] Assignee: Regie Nationale des Usines Renault, France
[21] Appl. No.: 191,734
[22] Filed: Sep. 29, 1980

Related U.S. Application Data

[62] Division of Ser. No. 891,995, Mar. 31, 1978, Pat. No. 4,291,594.

[30] Foreign Application Priority Data

Mar. 31, 1977 [FR] France ................. 77 09799

[51] Int. Cl.³ .................. B60K 41/14; B60K 41/28
[52] U.S. Cl. ................ 192/0.032; 192/0.044; 192/0.09; 192/0.076; 192/3.58; 74/866
[58] Field of Search .......... 192/0.09, 0.033, 0.032, 192/0.044, 0.055, 0.073, 0.076, 0.092, 0.094, 0.082, 3 M, 3.58, 103 R; 74/866, 846; 123/357, 492

[56] References Cited

U.S. PATENT DOCUMENTS

| | | | |
|---|---|---|---|
| 3,292,449 | 12/1966 | Lewis et al. | 74/846 |
| 3,426,624 | 2/1969 | Karig et al. | 74/846 |
| 3,530,668 | 9/1970 | Siebers et al. | 74/866 X |
| 3,724,430 | 4/1973 | Adler | 123/357 |
| 3,752,011 | 8/1973 | Casey et al. | 74/866 X |
| 3,835,733 | 9/1974 | Wurst | 74/866 |
| 3,890,360 | 6/1975 | Pruvet et al. | |
| 3,903,759 | 9/1975 | Hashimoto | 74/866 |
| 3,927,528 | 12/1975 | Kolk et al. | |
| 3,939,738 | 2/1976 | Adey et al. | 123/357 X |
| 4,046,032 | 9/1977 | Braun et al. | |
| 4,079,638 | 3/1978 | Sibeud | 74/866 |
| 4,107,776 | 8/1978 | Beale | 74/866 X |
| 4,159,697 | 7/1979 | Sweet | 123/492 |

FOREIGN PATENT DOCUMENTS

| | | |
|---|---|---|
| 556005 | 4/1957 | Belgium. |
| 2108987 | 9/1972 | Fed. Rep. of Germany. |
| 2328112 | 12/1973 | Fed. Rep. of Germany. |
| 2319510 | 2/1977 | France. |

Primary Examiner—George H. Krizmanich
Attorney, Agent, or Firm—Beveridge, De Grandi & Kline

[57] ABSTRACT

In the regulation of a motor-drive unit for a motor vehicle having a heat-engine and a continuously variable ratio transmission, in a clutch-engaged phase the heat-engine fuel feed is controlled so that it is a function of the displacement of the accelerator pedal of the vehicle and of the speed of the heat-engine such that the power delivered by the engine is substantially equal to the power required for that displacement of the accelerator pedal. In addition, the transmission ratio is controlled so that the speed of the heat-engine approaches an ideal speed which depends upon the power required and is predetermined for operation of the motor-drive unit which is optimalized in accordance with a chosen criterion. Operation is thus obtained with, for example, minimum consumption or pollution while taking into account, in the transient phase, the operation desired by the driver.

10 Claims, 16 Drawing Figures

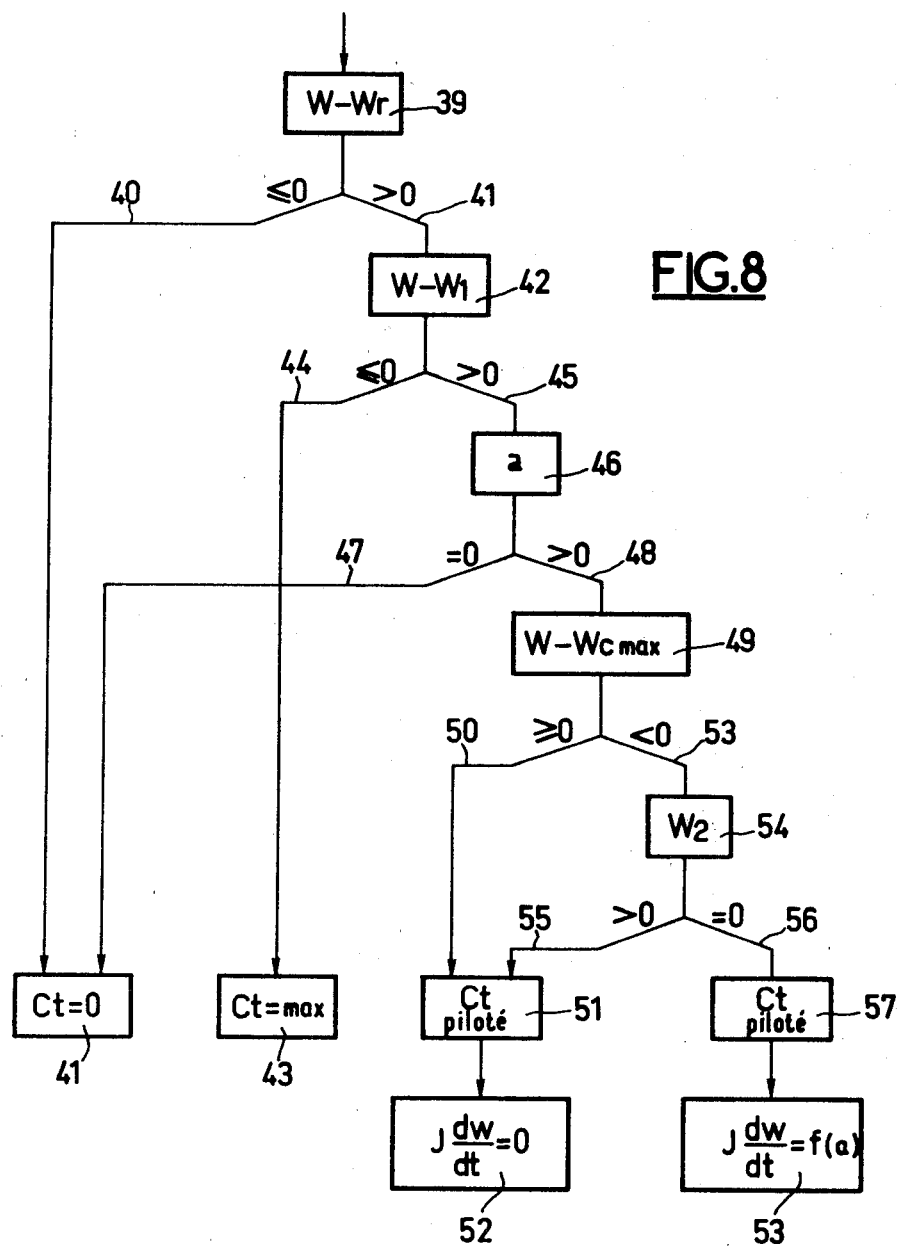

VEHICLE ENGINE CONTROL

This is a division of application Ser. No. 891,995 filed Nov. 31, 1978 now U.S. Pat. No. 4,291,594.

This invention relates to the regulation of a motor-drive unit for a motor vehicle, which is capable of ensuring optimum operation in accordance with a predetermined criterion such, for example, as minimum consumption of energy, minimum pollution, minimum noise or a combination of these criteria.

The regulation of the invention is applicable to a motor-drive unit comprising mainly a heat-engine and a transmission having a continuously variable transmission ratio. The heat-engine may, for example, be a controlled-ignition engine, a diesel engine, a Stirling engine, a Rankine engine or a gas turbine. In a general way the method of the invention may be applied to any motive device employing the combustion of a fuel fed from outside.

The transmission employable in the method of the invention may, for example, be a variator having a belt produced from an elastomeric rubber or metal material, or a mechanical variator with discs with rollers or with balls. The transmission may equally well be of purely hydrostatic type or having power division possibly multi-mode. In the case where the transmission contemplated for putting into effect the method of the invention does not enable zero output speed for an input speed which is not zero and/or in the case where the heat-engine cannot deliver a torque for zero speed of rotation, the method of the invention necessitates the existence of a clutch located between the heat-engine and the transmission.

At present several types of motor-drive units for a motor vehicle exist of the aforesaid type. The regulation of these motor-drive units of known type is in general not very sophisticated and not very flexible. The disadvantage of transmissions having a continuously variable transmission ratio with respect to conventional mechanical transmissions is that of usually exhibiting distinctly lower efficiency. The result is that vehicles equipped with these motor-drive units of known type exhibit high fuel consumptions taking into consideration their performance.

It will be observed that in regulations of conventional type of these motor-drive units the range of transmission ratios realized is generally such that it enables the vehicles so equipped to start on the steepest slopes commonly encountered on the lowest transmission ratio and to reach the maximum possible speed taking into account the maximum power of the heat-engine at the highest transmission ratio.

If the properties of these heat-engines are analysed, it is found that it is possible to reduce the fuel consumption substantially be widening the range of transmission towards the high transmission ratios. In this way it is possible to associate stabilized speeds near to the maximum speed with speeds of rotation of the heat-engine far from the speed of rotation which corresponds with maximum power. This result may be obtained whilst preserving the capability of starting on a steep slope.

On certain private vehicles equipped with a mechanical transmission of conventional type, this widening of the range towards high transmission ratios is achieved by the addition of a fifth overgeared speed. The operation of the motor-drive unit on a high or overgeared transmission ratio at steady speed is, however, accompanied by a considerable reduction in the vehicle's capability of overtaking and of surmounting slopes as long as the transmission remains on this ratio. In order to restore better performance to the vehicle it would be necessary for any supplementary depression of the accelerator pedal to be followed rapidly by an evolution of the transmission ratio towards lower transmission ratios or for the conditions of feed to the heat-engine to be modified at the same time.

In the French patent application No. 72 19 933 filed by the Applicants there is described a method of control of a motor-drive unit equipped with a hydrstatic transmission. In this method of known type, the fuel feed to the heat-engine is effected according to a law contained in the memory of a governor device so as to ensure operation according to a torque-speed characteristic which is predetermined in particular by desired characteristic of minimum consumption, minimum pollution or minimum noise. Independently of the fact that this method is restricted to the particular case of a hydrostatic transmission, it will be observed in addition that the fuel feed is controlled only as a function of the actual speed of rotation of the heat-engine, so that during the transient periods when one wants to modify the operation the known method only allows slow variation of the operation of the motor-drive unit, which is a variation which hence does not take into account a wish for rapid modification by the driver.

The object of the present invention is a method of regulation of a motor-drive unit for a motor vehicle, of the type previously indicated, which enables operation of the motor-drive unit in a steady phase, which is as near as possible to an ideal line of operation on the power/speed of rotation curve whilst ensuring a very high rapidity of response in a transient phase by taking into account the wishes of the driver for rapid modification, the regulation then authorizing operation outside the ideal line previously defined.

Thus the object of the invention is a method of regulation of the type previously described, in which the fuel feed to the heat-engine depends not only upon the actual speed of rotation of the said engine but equally upon the position of the accelerator pedal actuated by the driver of the vehicle.

When the vehicle is moving and more precisely in the clutched-in phase in the case where the motor-drive unit includes a clutch, the object of the invention is a method of regulation in which the accelerator pedal of the vehicle is a control of the power furnished by the heat-engine.

In the case where the motor-drive unit includes a clutch, the object of the invention is a method of regulation in which during the phase of engaging the clutch the accelerator pedal is a control of the acceleration of the vehicle.

In the clutched-in phase the regulation of the invention tends to locate the point of operation of the heat-engine on the ideal curve defined as a function of a chosen criterion. When the transmission of the motor-drive unit does not allow the actual point of operation to be located on this ideal curve at every moment, the regulation of the invention tends to ensure the supply of the power required at the speed nearest to the ideal speed, which is compatible with the transmission and the speed of the vehicle at the moment in question.

In the clutch-engaging phase the regulation tends to reduce the duration of the phase of engaging the clutch by ensuring, in particular, low speeds of rotation of the heat-engine without reducing the capability of starting of the vehicle on a slope.

The method of regulation in accordance with the invention, of a motor-drive unit for a motor vehicle which comprises a heat-engine and a transmission having a continuously variable transmission ratio, consists in controlling the feed of fuel to the heat-engine as a function of the two variables which consist on the one hand of the displacement of the accelerator pedal of the vehicle and on the other hand of the speed of rotation of the heat-engine, this control being effected so that the power delivered by the heat-engine is as near as possible to the power required which corresponds with the displacement of the accelerator pedal. Furthermore, in accordance with the invention the transmission ratio is controlled so that the speed of rotation of the heat-engine tends to approach an ideal speed which depends upon the power required and is predetermined for operation of the motor-drive unit, which is optimalized according to a chosen criterion.

The control of the transmission ratio may be achieved by keeping the speed of variation of the ratio proportional to the control signal, that is to say, proportional to the difference between the actual speed of rotation of the heat-engine and the ideal speed. One may equally well proceed with the control of the transmission ratio by calculating an ideal transmission ratio from the ideal speed previously defined. The speed of variation of the transmission ratio will then be kept proportional to the difference between the actual transmission ratio and the ideal transmission ratio. Of course, the transmission ratio will always remain lying between the extreme values possible for the transmission ratio. This regulation establishes the highest transmission ratio when the driver releases the accelerator pedal without pressing on the brake pedal. If it is desired to render the engine braking more effective than that which is obtained under these conditions, it is necessary to control the transmission so as to obtain a lower transmission ratio as soon as the driver exerts a force on the brake pedal. The method of the invention therefore provides, upon detection of pressure upon the brake pedal of the vehicle, for controlling the transmission ratio so that the speed of rotation of the heat-engine tends to approach a predetermined speed which increases the engine braking. This predetermined speed may be chosen to be of constant value or, in a preferred embodiment, as a function of the speed of the vehicle or of the force exerted on the brake pedal. One may equally well visualize making this predetermined speed depend upon these two variables.

In the case where the motor-drive unit includes a heat-engine connected by way of a clutch to the transmission having a continuously variable transmission ratio, the method of regulation of the invention provides, in order to proceed with starting of the vehicle from rest, during a phase of engaging the clutch during the course of which the transmission ratio is kept at its lowest value, for controlling the feed of fuel to the heat-engine as a function of the two variables which consist on the one hand of the displacement of the accelerator pedal of the vehicle and on the other hand of the speed of rotation of the heat-engine. This control is carried out so that the driving torque delivered by the heat-engine is constant or increasing for increasing values of the speed of rotation of the heat-engine. Moreover, the torque transmitted by the clutch is controlled so that the angular acceleration of the heat-engine is constant or increasing for increasing values of the displacement of the accelerator pedal as long as the vehicle remains stationary. As soon as the vehicle moves, the torque transmitted by the clutch is on the contrary controlled so that the speed of the heat-engine remains constant.

In a preferred embodiment one proceeds in addition to disengage the clutch if the speed of rotation of the heat-engine becomes lower than a limiting value chosen as a function of the operation of the heat-engine at tickover. This limiting value may be chosen as a function of the position of a member which enables operation of the heat-engine cold. This limiting value may equally well be chosen as a function of the temperature of the cooling fluid at the outlet from the heat-engine.

In an equally preferred embodiment one provides for limiting, in addition, the speed of rotation of the heat-engine so that in no case does it exceed the speed which corresponds with the maximum torque of the heat-engine. In this way the wear on the clutch is limited without reducing the capability of the vehicle for starting, in particular starting on a slope.

The regulating device enabling the putting into effect of the method of the invention comprises mainly a sensor of the speed of rotation of the heat-engine, a sensor of the displacement of the accelerator pedal and a sensor of the speed of rotation of the output shaft from the transmission. The regulating device likewise comprises a logic unit or calculating unit comprising means for calculating from stored data the fuel feed to the heat-engine as a function of the two variables which consist of the displacement of the accelerator pedal and the speed of rotation of the heat-engine. The logic unit is likewise capable of calculating the ideal speed defined previously as a function of the displacement of the accelerator pedal for operation optimalized according to a chosen criterion.

The regulating device likewise comprises a device for control of the feed to the heat-engine and a device for control of the transmission ratio, these control devices receiving their information from the aforesaid logic unit.

In the case where it is required to improve, as has been indicated, the engine braking, the device of the invention comprises in addition a sensor of the force exerted on the brake pedal, the logic unit then including means for calculating from stored data the aforesaid predetermined speed as a function of the effective speed of the vehicle and/or of the force exerted on the brake pedal.

In the case where the motor-drive unit includes a clutch located between the heat-engine and the transmission, the regulating device of the invention comprises, in addition, a sensor of the speed of rotation of the input shaft to the transmission, which may then be different from the speed of rotation of the heat-engine, and a device for control of the clutch which enables control of the torque transmitted by the clutch during the phase of engaging the clutch as well as disengagement and engagement of the clutch. In a preferred embodiment of the device of the invention it comprises means for storing a number of pairs of functions which represent, respectively, the ideal speed of rotation of the heat-engine and the specific speed of the said heat-engine for obtaining engine braking. This pair of functions each of which may be a function of two variables, characterizes, in fact, a particular criterion of optimalization. The regulating device then advantageously comprises means for switching for introducing a specific pair of these functions into the logic unit. In this way it is possible to put into effect the method of regulation of the invention by applying, in succession, different criteria of optimalization.

Figure 2:
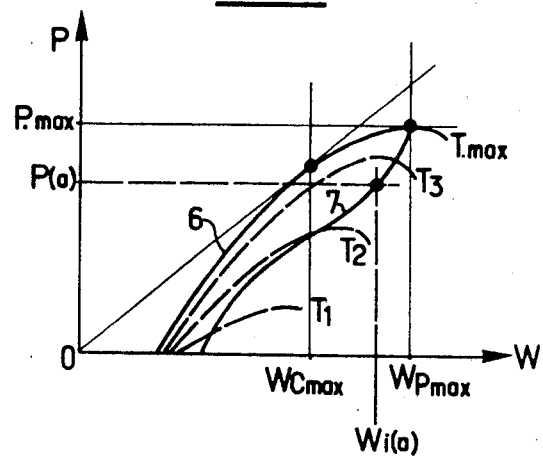
Figure 3:
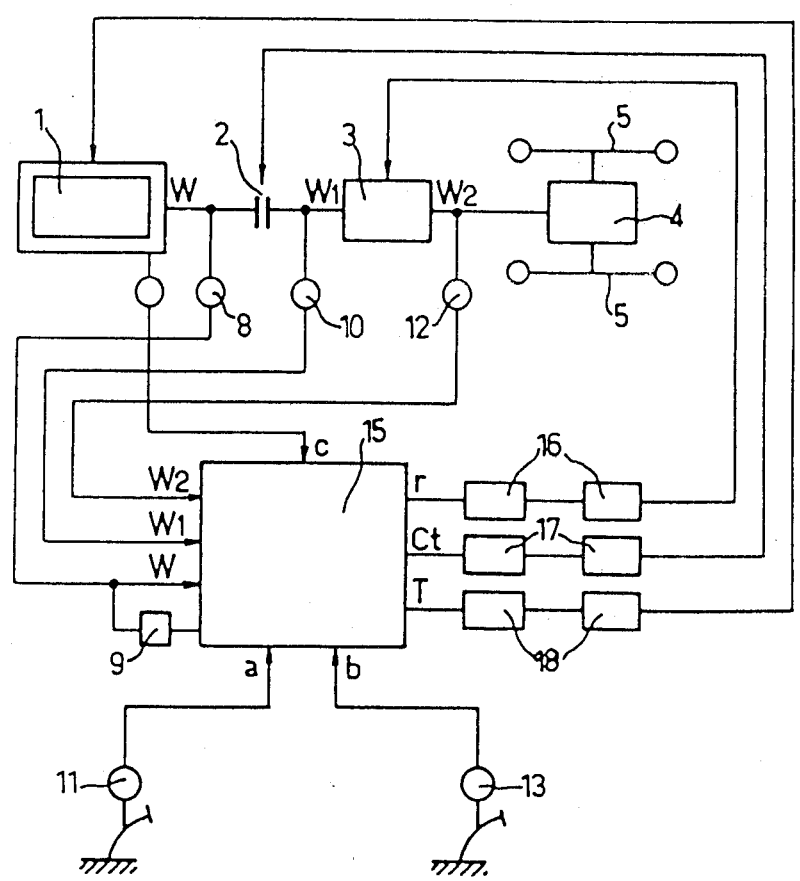
Figure 6:
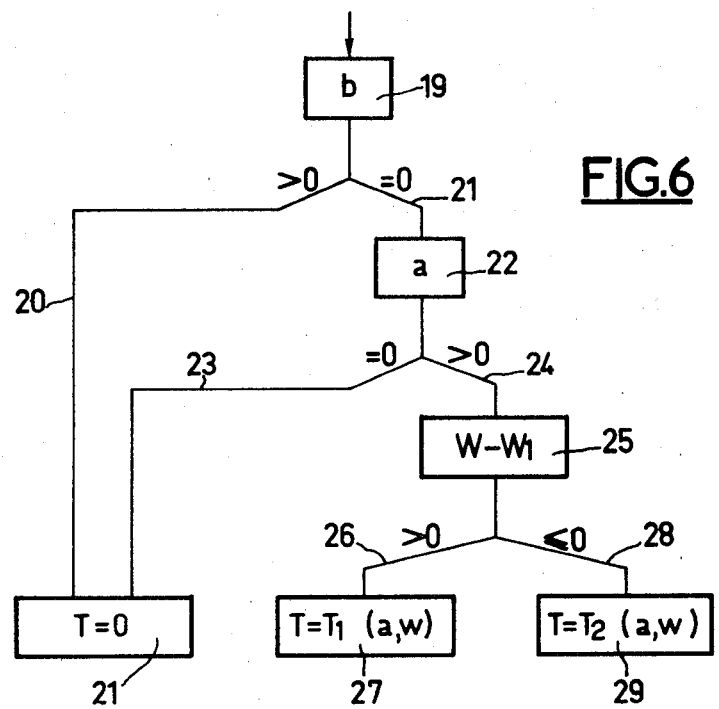
Figure 7:
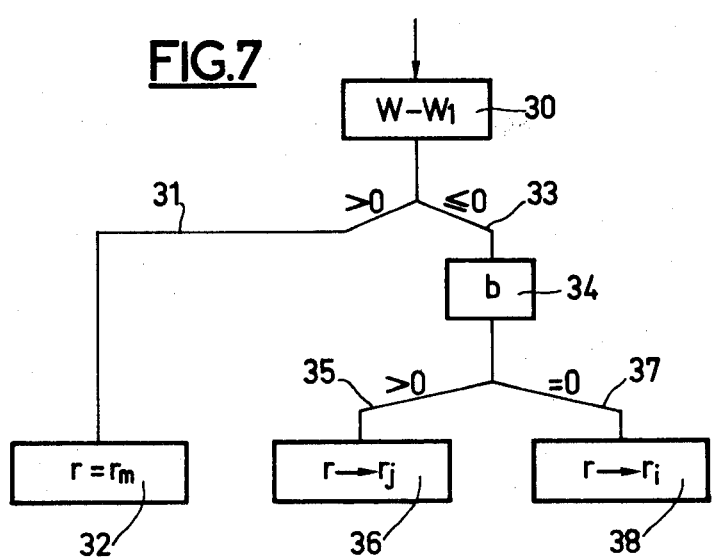

The invention will be better understood from study of the detailed description which is to follow, being made with reference to the attached drawings in which:

FIG. 1—represents very diagrammatically a motor-drive unit employed in the present invention;

FIG. 2—represents the curve of the variations in power as a function of the speed of rotation of a heat-engine for certain values of the fuel feed;

FIG. 3—is a diagrammatic view showing the different inputs and outputs of the logic unit employed in the present invention;

FIGS. 4a to 4d—illustrate the development of the method of the invention;

FIGS. 5a to 5f—illustrate the development of the method of the invention in the phase of engaging the clutch in the case where the motor-drive unit includes such a clutch;

FIG. 6—is a block diagram showing the logic of the regulation as far as the control of the feed of fuel to the heat-engine is concerned;

FIG. 7—is a block diagram of the logic of the regulation as far as the control of the transmission ratio is concerned; and FIG. 8—is a block diagram illustrating the logic of the regulation as far as the control of the clutch is concerned.

The method of the invention may be applied, as has been seen, to a motor-drive unit including a clutch or not. FIG. 1 illustrates, by way of example, such a motor-drive unit equipped with a clutch. As may be seen in FIG. 1, the heat-engine 1 is connected by way of a clutch 2 to a transmission 3 enabling a transmission ratio to be established which is continuously variable. The output from the transmission 3 is connected to a reducer-reverser-differential unit 4 which controls the wheels 5 of the vehicle.

FIG. 2 shows on the power (P)/speed of rotation (w)graph the characteristic curve 6 for the maximum fuel feed (T max). Other curves, shown dotted, show the variation in power for other values $T_1$, $T_2$, $T_3$ of feed to the heat-engine. As is known, the maximum power of the engine corresponds with a speed of rotation $w_{Pmax}$. Furthermore, the tangent to the curve 6 from the origin defines the speed of rotation of the heat-engine $w_{Cmax}$ which corresponds with maximum torque.

Depending upon the ideal criterion chosen, which may, for example, be the minimum consumption of fuel, it is possible to define an ideal curve of speed referenced 7 in FIG. 2. In the case where the criterion chosen is the minimum consumption of fuel, this line is the locus of the minima of specific consumption of fuel which passes obviously through the point of maximum power towards the high speeds and which rejoins the idle towards the low speeds. It will be observed that in this zone the ideal curve may advantageously be modified in order to avoid vibrating operation at all events for certain types of heat-engines.

To the power required by the driver of the vehicle, which may be considered as a function increasing with the displacement or depression (a) of the accelerator pedal, at least in the clutch-engaged phase, there corresponds an ideal point of operation located on the ideal line 7. There results from it an ideal speed of rotation $w_i(a)$ and a particular position T(a) of the means of fuel feed to the heat-engine.

Referring now to FIG. 3, it is seen that in the example illustrated the regulating device of the motor-drive unit of the invention comprises a sensor 8 of the speed of rotation w of the heat-engine. The sensor 8 may, for example, be a tachometer generator delivering an analogue signal. It may equally well be realized in the form of a pulse generator associated with a counter which delivers a numerical signal which is then directly usable in the calculating unit. On the other hand the analogue signal furnished by the tachometer generator must previously be processed by an analogue/numerical converter (not shown). The processing unit 9 which includes a memory and a subtractor enables the calculation of the differential of the speed w with respect to time. It will be observed that the analogue signal representative of the speed of rotation w of the heat-engine enables a voltage proportional to this differential to be obtained directly by employing a RC circuit of known type.

The device comprises in addition a pick-up 10 which determines the speed of rotation $w_1$ of the input shaft to the variator of the transmission 3 which may be seen in FIG. 1. The signal supplied may equally well, alternatively, represent the discrepancy in speed between the rotation of the heat-engine and the input shaft to the variator (w-$w_1$).

The device likewise comprises a sensor 11 of the depression or of the displacement (a) of the accelerator pedal of the vehicle. This sensor may deliver a voltage proportional to the displacement which is processed in an analogue-numerical convertor before use by the calculating unit.

Whatever the motor-drive unit employed in the method of the invention, the sensors 8, 10 and 11 are always necessary. On the other hand, depending on the case and depending upon the sharpness of the results which it is desired to obtain, it is possible to add to these three first sensors other sensors enabling measurement of different parameters.

Thus the sensor 12 provides an indication which corresponds with the speed of rotation $w_2$ of the output shaft from the variator of the transmission 3 or else of the speed of the vehicle proper. This sensor may be produced in the same way as the sensor 8.

One may likewise provide a sensor 13 of the force b exerted by the driver on the brake pedal of the vehicle. This indication is employed in the case where it is desired to obtain engine braking depending upon the force exerted on the brake pedal. This sensor 13 may consist of a strain gauge device or of a displacement sensor equipped with a mechanical assembly of known type. In the case where the signal provided by the sensor is an analogue signal, the device of the invention comprises an analogue-numerical converter which transforms the signal before its use by the calculating unit.

The device may include a sensor 14 which detects the temperature of the cooling fluid at the output from the heat-engine or the position of a device enabling operation cold such as a throttle-valve for starting, on an engine having controlled ignition.

The group of these sensors furnishes indications to the input to a logic unit or calculating unit 15 which may preferably consist in the form of a microprocessor the functions of which will be described later on. The operations to be carried out by the logic unit 15 consist of comparisons between values in store and/or measured values which necessitate the presence of analogue or numerical comparison devices. The logic unit 15 must likewise be in a position to calculate functions of one or two variables which could be stored either in the form of an analytical definition or by a group of values, the calculating unit then working by interpolation.

It will be understood that in all cases the production of such a logic unit which only puts into effect well known elements from the technique does not pose any particular problem to one skilled in the art.

At the output from the logic block 15 there are arranged three actuators combined where necessary with converters of numerical-analogue type, each of these assemblies constituting a device for control of one parameter of the motor-drive unit. The control device 16 pilots the heat-engine fuel feed.

In the case where this heat-engine is a conventional controlled-ignition engine the control device 16 will, for example, enable positioning of the butterfly valve in the carburettor. It will be observed that the zero value of the feed T corresponds in practice to the heat-engine feed for running unloaded at idle.

The device 17 for control of the clutch 2 enables control of the torque $C_t$ transmitted by the clutch during the clutch-engaging phase or of its differential with respect to time, as well as disengaging or engaging the said clutch in the case where the latter is provided in the motor-drive unit employed in the present invention.

The control device 18 enables piloting of the transmission ratio r which is defined as being the ratio between the output speed from the variator and the input speed to the variator, or $(w_2)/(w_1)$. It will be observed, of course, that in all cases the transmission ratio remains lying between a maximum value corresponding with the highest ratio which it is possible to obtain with the transmission 3 and a minimum value corresponding with the lowest transmission ratio which enables, especially, starting of the vehicle.

The structure of the control device 18 depends upon the particular technology of the transmission employed. One may visualize employing as the control device 18 a hydraulic or pneumatic jack associated with solenoid valves. In a variant this control device may consist of an electric motor.

Operation of the regulating device of the invention will now be described by showing the essential characteristics of the method, depending upon FIGS. 4a to 4d. This description of the operation corresponds with a clutched-in phase in the case of a motor-drive unit such as is represented in FIG. 1, which includes a clutch referenced 2. Hence, it is a matter of the case where the vehicle is moving with a certain speed, the torque transmitted by the clutch being equal to the torque supplied by the heat-engine, since the clutch 2 is in the engaged position. This operation may equally well appear in the case of a motor-drive unit which does not comprise such a clutch, for example in the case of a hydrostatic transmission. In the latter case, this operation will be that of the regulating device whatever the speed of the vehicle including during a starting phase.

During this phase, which it will suit us to call below the clutched-in phase, the regulation of the invention tends to locate the point of operation of the heat-engine on the ideal curve referenced 7 in FIG. 2 and defined, as was said previously, as a function of a chosen criterion of optimization. Of course, the actual transmission does not in all cases enable this point to be located on this ideal curve at every moment. The method of regulation of the invention therefore tends to ensure the supply of the power required at the speed nearest to the ideal speed compatible with the transmission and the speed of the vehicle at the moment in question.

During this clutched-in phase the accelerator pedal is a power control. With increasing depressions of the accelerator pedal there correspond increasing levels of power to be supplied by the engine and ideal generally increasing speeds of rotation.

The method of the invention provides in this clutch-in phase for controlling the heat-engine fuel feed which corresponds with the supply of the power $P(a)$ which is required by the depression a of the accelerator pedal, that is to say by the driver, or a power as near to it as possible.

The fuel feed is a function of the two variables which consist of the displacement a of the accelerator pedal of the vehicle and the speed of rotation w of the heat-engine.

Thus, one has $T = T(a,w)$. In this way the power P of the engine, which depends in general on the fuel feed and the speed of rotation, becomes solely a function of the depression a of the accelerating pedal.

Furthermore, the method of the invention likewise provides for acting upon the transmission ratio so that the speed of rotation w of the heat-engine tends to approach the ideal speed $w_i(a)$ which corresponds with the power required $P(a)$, that is to say, which corresponds with the position of the accelerator pedal.

Figure 4A:
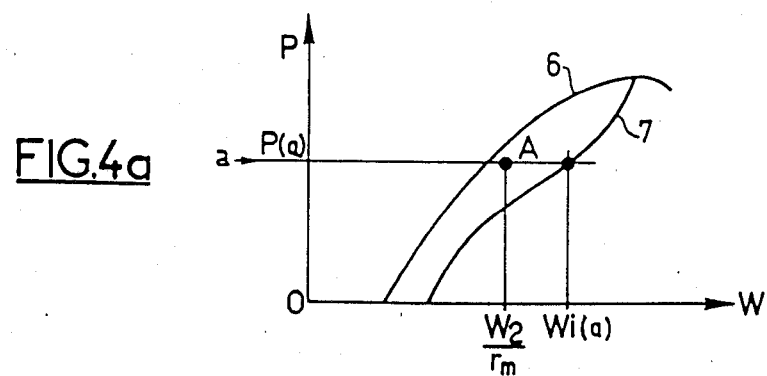

When the driver makes a depression a of the accelerator pedal with the vehicle running at a speed V, the speed of rotation of the output shaft from the transmission $w_2$ is defined. The speed of rotation w of the heat-engine may then adopt a value lying between two values determined by the possibilities of the transmission $w_2/r_M$ and $w_2/r_m$ where $r_M$ is the highest transmission ratio and $r_m$ is the lowest transmission ratio. Taking into account the value of the ideal speed of rotation $w_i(a)$ calculated by the logic unit 15 as a function of stored numerical data, a number of cases may present themselves depending on the value of this ideal speed of rotation with respect to the two possible limiting values for the actual speed of rotation of the engine. FIG. 4a illustrates the first case where the ideal speed of rotation would be higher than the maximum actual speed of rotation which it is possible to obtain. So one has:

$$\frac{w_2}{r_m} < w_i(a).$$

Figure 4B:
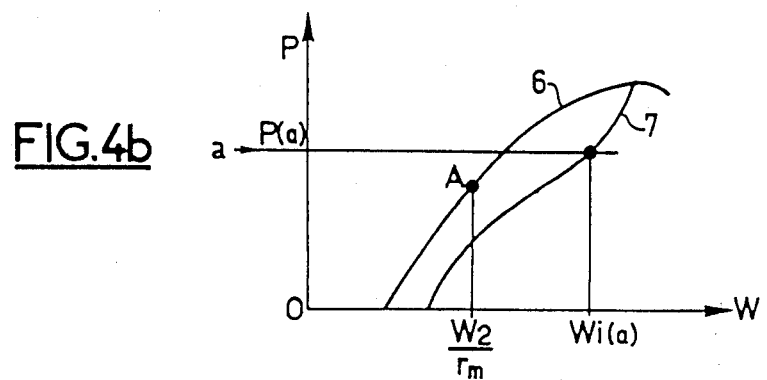

The regulation of the invention establishes or tends to establish the lowest transmission ratio $r_m$, the point of operation being marked A on FIG. 4a. It will observed that it may happen in certain cases that the heat-engine is then incapable of supplying the power required $P(a)$ even for the maximum feed represented by the curve 6. This case is illustrated in FIG. 4b where it may be seen that the point of operation A which corresponds with the maximum possible speed of the actual heat-engine lies on the maximum feed curve 6 but at a value of power less than the power required $P(a)$.

Figure 4C:
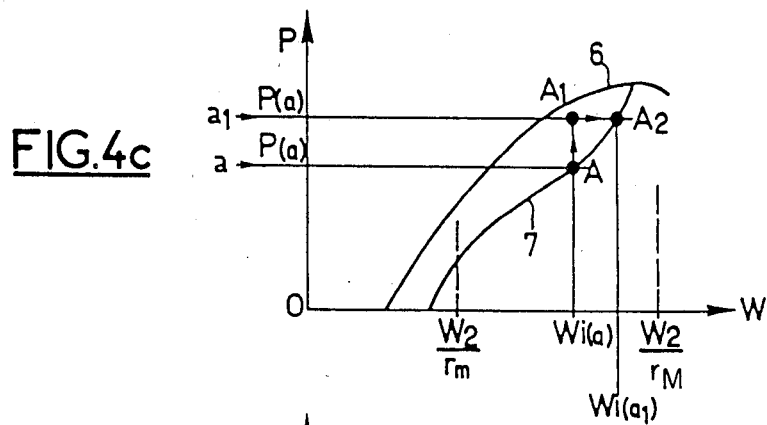

In the case represented in FIG. 4c the ideal speed of rotation $w_i(a)$ is lying between the two possible limits. In this case, the regulation establishes, or tends to establish, the actual transmission ratio such that the engine revolves at the ideal speed. The point of operation A then lies on the ideal curve.

Figure 4D:
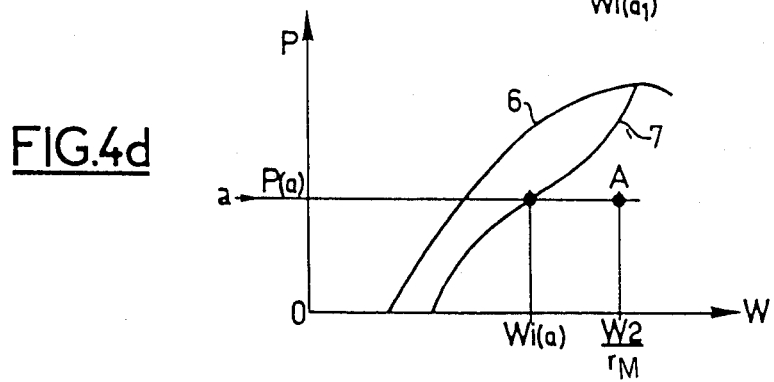

Finally, FIG. 4d illustrates the case where the calculated ideal speed is less than the minimum speed which it is possible to obtain with the transmission under the conditions in question. One has:

$$w_i(a) < \frac{w_2}{rM}.$$

In this case the regulation establishes, or tends to establish, the highest transmission ratio which brings the speed as nearly as possible to the ideal speed. The point of operation is marked by A.

It may be seen that in this way the method of regulation of the invention enables in steady operation the piloting of the transmission ratio so that the speed of rotation of the heat-engine approaches as closely as possible the ideal speed of rotation as a function of the chosen criterion of optimalization.

Furthermore, in the transient phase the method of the invention takes into account the wishes of the driver to obtain, for example, a higher power since the feed is piloted not only as a function of the speed of rotation of the heat-engine but equally as a function of the position of the accelerator pedal. Let us consider, for example, the point of operation A in FIG. 4c at a given moment, which point is located on the ideal curve of operation 7. Let us suppose that at this moment the driver depresses the accelerator pedal to a value $a_1$ larger than a, thus requiring a power $P(a_1)$ level higher than $P(a)$. Taking into account the inertia of the motor-drive unit, it may be considered that the speed of rotation w remains first of all substantially constant, the point of operation therefore moving up to the point $A_1$. Hence, it may be seen that one is moving away from the ideal curve of operation, the power required being, however, almost immediately that which is required by the driver $P(a_1)$. The regulation then pilots the transmission so as to act upon the transmission ratio in order to return to the ideal curve at the point of operation $A_2$ with which corresponds the ideal speed of rotation of the heat-engine $w_i(a_1)$. Thus a transient response is obtained which is very rapid and corresponds with the wishes of the driver.

In the operation which has just been described, the regulation of the invention always establishes in the clutched-in phase the highest transmission ratio when the driver releases the accelerator pedal, that is to say, when a=0. In this case the ideal speed of rotation of the engine corresponds with the idle performance, so that the engine braking which it is possible to obtain is not very effective. In a preferred embodiment, the method of the invention provides for acting upon the transmission so as to bring about a lower transmission ratio as soon as the driver presses the brake pedal. In this case, the fuel feed being constant and equal to zero, the transmission ratio can be piloted so that the speed of rotation of the heat-engine becomes equal either to a constant value determined initially or to a value which will be a function of the speed of movement of the vehicle or a function of the force b exerted on the brake pedal or else a function of these two parameters. The determination of the required value of this speed of rotation of the heat-engine will depend upon the engine braking which it is wished to obtain in each particular case. In practice one may visualize making this predetermined speed $w_i(b,w)$ the greater, the higher the speed of movement of the vehicle and the higher the force exerted on the brake pedal.

In order to avoid the heat-engine stalling, the method of the invention likewise provides for disengaging the clutch, thus nullifying any engine braking, as soon as the speed of rotation of the heat-engine w becomes less than the speed of rotation corresponding with idle $w_r$, the said tickover speed of rotation being a function of the temperature of the cooling fluid at the engine output or of the position of an auxiliary device for operation cold. These data are supplied by the sensor 14.

The operation of the regulation of the invention will now be described with reference to FIGS. 5a to 5f, in the case where the motor-drive unit includes a clutch and during a phase of engaging the clutch, which corresponds with starting the vehicle from a position of rest. In this case the regulation of the invention tends to reduce the duration of the phase of engaging the clutch by ensuring, in particular, low speeds of rotation of the engine without reducing the capability of the vehicle for starting on a slope. In the phase of engaging the clutch the accelerator pedal is a vehicle acceleration control.

During this phase the transmission ratio remains constant at its lowest value rm. In this starting phase the object of the regulation of the invention is to make the torque supplied by the heat-engine constant or increasing as a function of the speed of rotation of the said heat-engine. To this end, the method of regulation of the invention provides for controlling the heat-engine fuel feed as a function of the two variables which constitute, on the one hand, the displacement a of the accelerator pedal of the vehicle and, on the other hand, the speed of rotation w of the heat-engine. Hence, one has $T = T_1(a,w)$.

The engine torque which is, in general, a function of the two variables which are the fuel feed and the speed of rotation, therefore becomes a function of the position of the accelerator pedal and of the speed of rotation of the engine. Hence, a driving torque is finally obtained, which increases as a function of the speed of rotation of the engine whatever the position of the accelerator pedal a.

The phase of engaging the clutch is broken down into two periods as illustrated in FIGS. 5a to 5f. In the first period of duration $t_o$ the vehicle remains stationary. The torque transmitted by the clutch $C_t$ is less than the opposing torque in the input shaft to the transmission $C_r$.

The curves of FIGS. 5a to 5f show the variation in certain quantities as a function of the time t. It may be seen that in FIG. 5a the driver is acting upon the accelerator pedal at the time 0, the parameter a which represents the position of this pedal proceeding from the value 0 to a conventional value 1.

Figure 5A:
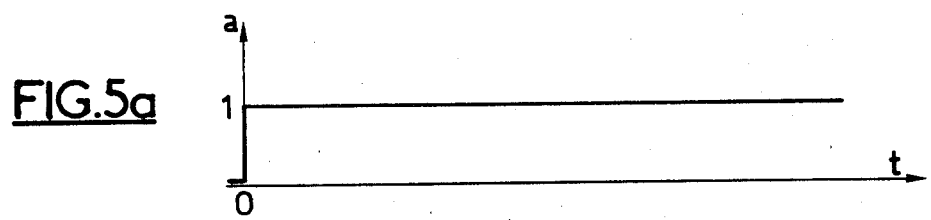
Figure 5B:
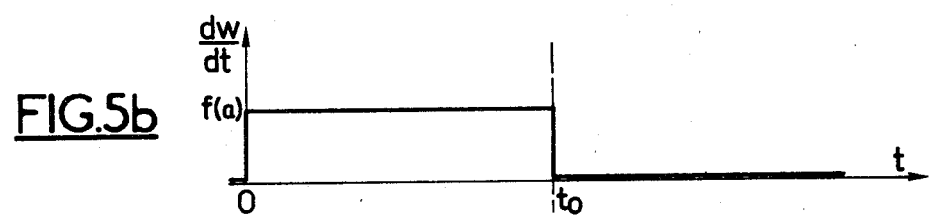
Figure 5C:
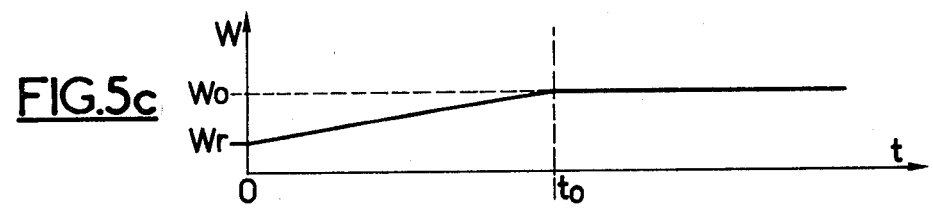
Figure 5D:
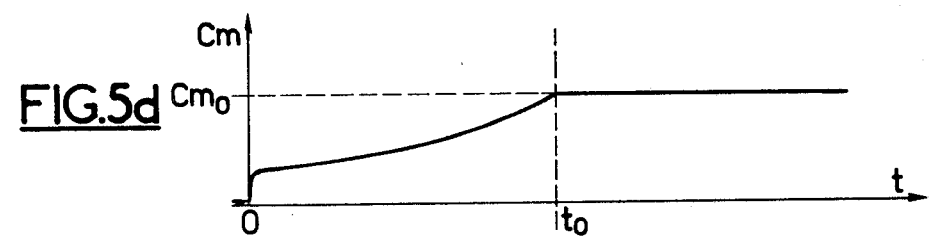

The method of regulation of the invention likewise provides for controlling the clutch so that the torque $C_t$ transmitted by the clutch is piloted at any moment so that the angular acceleration of the engine is constant and an increasing function of the position of the accelerator pedal a in this first phase of engaging the clutch, that is to say, during the time $t_0$. The result is the variations which may be seen in FIG. 5b which represents the acceleration of the heat-engine dw/dt as a function of time. During this phase the driving torque $C_m$, represented in FIG. 5d, is increasing up to a value which remains less than the maximum torque.

Figure 5E:
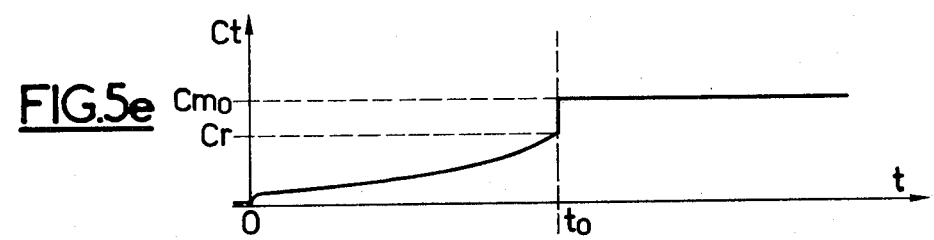

The torque transmitted by the clutch $C_t$, the variations in which are represented in FIG. 5e, likewise increases until it reaches, at the moment $t_0$, the value $C_r$ of the opposing torque. The fundamental equations of the system are:

$$C_m(T,w) - C_t = J\frac{dw}{dt} \qquad (1)$$

where J represents the inertia of the engine and the portion of the clutch which is connected to the said engine.

Hence the regulation brings about the transformation:

$$C_t = C_m(T,w) - f(a) \ldots \qquad (2)$$

or taking into account the fuel feed $T = T_1(a,w)$:

$$C_t = C_m(a,w) - f(a) \ldots \qquad (3)$$

Figure 5F:
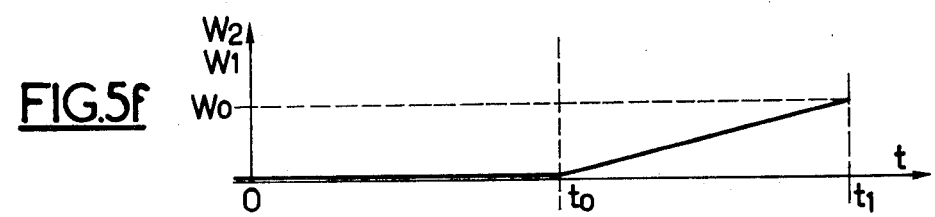

When the driving torque reaches the opposing torque, the vehicle is set in motion, as may be seen in FIG. 5f which represents the variations in output speed from the transmission $w_2$ or, which comes to the same thing, in the input speed $w_1$ to the said transmission which is equal to it except for the transmission ratio which is kept constant at its lowest value $r_m$. At this moment the speed of rotation of the engine w, the variations in which are represented in FIG. 5c, has proceeded from its tickover value $w_r$, which it had at time zero, to a value $w_0$ which therefore takes into account the starting conditions (slope, state of load, etc) by way of the opposing torque which is closely tied to the opposing torque at the wheels of the vehicle for a given transmission ratio.

Thus, it will be observed that the speed $w_0$ is the greater for a given depression of the accelerator pedal, the greater the opposing torque, which corresponds, for example, with starting on a steeper slope.

The method of regulation of the invention provides, starting from the time $t_0$ which is detected by the vehicle starting to move, for modifying the piloting of the torque transmitted by the clutch by acting this time upon the latter so that the speed of rotation of the heat-engine is kept constant and equal to its value $w_0$ from the time $t_0$. During this second period of the phase of engaging the clutch, the driving torque remains constant since the speed of rotation remains equal to $w_0$. Inasmuch as the vehicle is now in motion, one can write the relationship:

$$J_1\frac{dw_1}{dt} = C_t - C_r \qquad (4)$$

where $J_1$ represents the inertia of the vehicle and of the transmission reduced to its input shaft, the said transmission remaining at its lowest ratio $r_m$. In this phase, the driving torque is equal to the torque transmitted according to Equation (1), since the speed of rotation of the heat-engine w is constant, which entails $dw/dt = 0$. Hence one obtains:

$$J_1\frac{dw_1}{dt} = C_m(a,w_0) - C_r = C_{mo} - C_r \qquad (5)$$

Inasmuch as the engine fuel feed T is a function of only a and w, it compulsorily preserves its value reached at the moment $t_0$, since none of the variables is modified from this moment. Now, at this precise moment the difference appearing in FIG. 5e between the driving torque $C_{mo}$ and the opposing torque was equal to the function f(a) as that follows from Equation (3). From that results:

$$J_1\frac{dw_1}{dt} = f(a) \qquad (6)$$

In accordance with the method of the invention, the function f(a) is increasing so that it is found that the effective acceleration of the vehicle, which is proportional to the variation in the input speed to the shaft of the transmission $w_1$, is the greater, the more the driver has depressed the accelerator pedal. Hence it is seen that the regulation of the invention takes into account the wish of the driver to start more or less rapidly, being a wish which is expressed by a greater or lesser depression a of the accelerator pedal.

The second period of the phase of engaging the clutch or starting finishes at the time $t_1$ when the speed of the vehicle or the output speed $w_2$ of the transmission reaches the value of the speed of rotation of the heat-engine which is fixed at $w_0$ and which depends upon the starting conditions by way of the opposing torque $C_r$.

Hence the total duration of the phase of engaging the clutch is:

$$t_1 = \frac{w_C - w_r}{f(a)} + \frac{w_O}{f(a)} = \frac{2w_O - w_r}{f(a)} \qquad (7)$$

In order to avoid this duration being too long in the case where the driver bears very little on the accelerator pedal, it is advantageously provided that the function f(a) is not zero when a tends towards zero.

Excellent results have been able to be obtained in the method of the invention by employing as the function f(a) a linear function of the first degree of the displacement a of the accelerator pedal of the type:

$$f(a) = K_1 + K_2 a \ldots \qquad (8)$$

where $K_1$ and $K_2$ are positive constants which are not zero.

There will now be made clear with the aid of FIGS. 6 to 8 the different operations carried out by the logic unit 15 of FIG. 3.

FIG. 6 illustrates by a block diagram the piloting of the heat-engine fuel feed in a non-restrictive embodiment of a regulating device in accordance with the invention in which it is desired, in addition, to improve the engine braking as was said previously.

The sensor 13, which may be seen in FIG. 3, delivers to the calculating unit 15 the value of the force exerted by the driver on the brake pedal (b). The logic element 19 determines whether this force is zero or positive. In the case where the force exerted by the brake pedal is positive, the element 19 delivers information through the condition 20 to the fuel feed control device 16 which may be seen in FIG. 3, so that this feed is cut off, which corresponds with $T=0$ as indicated at 21 in FIG. 6. In the case, in fact, where the driver is bearing on the brake pedal, there is good reason for not feeding more fuel to the heat-engine than for operation at idle.

In the case where, on the contrary, the element 19 detects zero value of the force exerted on the brake pedal the logic makes use of the connection 21 and proceeds through the element 22 to a test of the value of the displacement of the accelerator pedal of the vehicle a, which is delivered by the sensor 11 of FIG. 3. In the case where the driver is not acting upon the accelerator pedal the element 22 transmits a signal through the connection 23 so that the control device 16 of FIG. 3 cuts off the heat-engine fuel feed as represented at 21 in FIG. 6.

If the element 22 detects, on the contrary, pressure upon the accelerator pedal of the vehicle, the logic is pursued along the connection 24 and the calculating unit proceeds to a test through the element 25 of the value of the speed of rotation of the heat-engine with respect to the speed of the input shaft to the transmission 3. Hence, the element 25 carries out a comparison, with respect to zero, of the quantity $w-w_1$. In the case where this quantity is positive, one is in the starting phase, and in the example in question where the motor-drive unit includes a clutch, the element 25 transmits information through the line 26 to the control device 16 so that the heat-engine fuel feed adopts the value of the function $T_1(a,w)$, which is contained in the form of data stored inside the calculating unit 15 and which, as has been seen, enables a driving torque to be obtained during the phase of engaging the clutch, which increases as a function of the speed of rotation of the heat-engine.

In the case where the comparison carried out in the element 25 gives a negative or zero result, which corresponds with a clutched-in phase, the element 25 gives, on the contrary, information through the connection 28 to the control device 16 so that the fuel feed is equal to the value of the function $T_2(a,w)$ as indicated at 29.

This function is likewise found in the form of data stored inside the calculating unit 15 and enables the power of the heat-engine to be established as closely as possible to the power required by the driver and corresponding with the value a.

In a simplified variant upon the method of the invention, it is possible to employ a constant value for the function $T_1$ in the phase of engaging the clutch on condition that for the heat-engine in question the result is correctly obtained, that is to say, a driving torque which is constant or increasing as a function of the speed of rotation.

Furthermore, in accordance with another possible simplification, one may visualize choosing identical functions $T_1$ and $T_2$. Finally, in another possible simplification the heat-engine feed in the clutched-in phase may be piloted so that it is a function of the depression of the accelerator pedal and of a speed determined from a calculated transmission ratio, that is to say, of the transmission ratio to be established and not of the actual transmission ratio as was the case up to now. One then has $T=T_3(a,(w_2)/rc)$ where rc is the calculated transmission ratio. It will be observed that this variant modifies the time of response of the motor-drive unit.

FIG. 7 illustrates, in the form of a block diagram, the development of the operation for piloting the transmission ratio by the calculating unit 15.

The speed of rotation of the heat-engine w delivered by the sensor 8, and the speed of rotation $w_1$ of the input shaft to the transmission delivered by the sensor 10 are introduced into a comparison element 30 which compares the difference between these speeds $w-w_1$ with respect to zero. In reality it will be understood that the logic element 30 is identical with the element 25 and in fact forms a single device inside the comparator unit 15. In the case where the result of this comparison is positive, one is in the starting phase, the speed of rotation of the heat-engine being higher than the transmission input speed. The element 30 then, by way of the connection 31, controls the transmission ratio control device 18, which may be seen in FIG. 3, so that this ratio is established at its lowest value as represented at 32.

In the case where the result of the comparison by the element 30 is negative or zero, one is on the contrary in the clutched-in phase and the logic is passed through the connection 33 up to a comparison element 34 which is, in fact, the element 19 from FIG. 6 and which compares with the value zero the value b of the force exerted on the brake pedal, delivered by the sensor 13. In the case where the driver is exerting a force which is not zero on the brake pedal, the element 34, by way of the line 35, controls the transmission ratio so that the speed of rotation of the heat-engine is established at the predetermined speed $w_j(b,w_2)$ which corresponds with the desired value of engine braking as was expressed previously. In the case where the transmission does not enable this speed to be obtained exactly, the transmission ratio is established at the value which enables the speed to be obtained which is as near as possible to this predetermined speed, which is expressed at 36 in FIG. 7 by the notation $r \rightarrow rj$.

If, on the contrary, the force on the brake pedal is zero, the element 34 transmits a signal through the connection 37 to the control device 18, so that the transmission ratio as indicated at 38 by the notation $r \rightarrow ri$ is such that the speed of rotation of the heat-engine approaches as nearly as possible the ideal speed $w_i(a)$, that is to say, the point of operation located on the ideal curve defined as a function of a chosen criterion of optimalization as was explained previously.

In order to proceed to the piloting of the transmission ratio in the clutched-in phase, one may proceed, in an embodiment of the invention, by comparing the speed of rotation of the heat-engine with the desired value which is either the ideal speed $w_i(a)$ or the speed predetermined for the engine braking $w_j(b,w_2)$. In accordance with this first variant, the transmission ratio is piloted so that its variation as a function of time is proportional to this deviation of speed according to the expression:

$$\frac{dr}{dt} = K(w - w_{i,j}) \qquad (9)$$

where $w_{i,j}$ is either the ideal speed $w_i(a)$ in the case where the driver is not pressing the brake pedal, or the speed predetermined for the engine braking $w_j(b,w_2)$ when the driver is pressing the brake pedal.

In another variant, upon the piloting of the transmission ratio in the clutched-in phase, the method of the invention visualized calculating first of all the ideal transmission ratio R, then acting upon the transmission ratio control device so as to make the actual transmission ratio tend as rapidly as possible towards this ideal transmission ratio R. It is equally possible to act on the transmission ratio control device so that its variation as a function of time is proportional to the difference between the ideal transmission ratio and the actual transmission ratio. It will be observed that, depending upon the phase of operation of the method, the ideal transmission ratio is either equal to the lowest ratio rm or to the highest transmission ratio $r_M$, or lying between these two extremes:

$$R = \frac{w_2}{w_{i,j}}$$

FIG. 8 illustrates in the form of a block diagram the piloting of the clutch in the case where it exists, the method of the invention then providing for piloting the torque transmitted by the clutch during the phase of starting the vehicle as has been seen previously.

The method of the invention provides for three possibilities of action on the clutch: one may act so that the clutch is put out, that is to say, the torque transmitted is strictly zero. One may act on the clutch so that the torque transmitted by the clutch is piloted, and finally one may act on the clutch so that it is let in, that is to say, the torque transmitted is a maximum.

The information proceeding from the sensor 14 of FIG. 3 enables the definition of a idle speed $w_r$ which is compared in the logic element 39 of FIG. 8 with the speed of rotation of the heat-engine. If the difference $w-w_r$ is negative or zero there is a risk of the heat-engine stalling and the method of the invention enables the clutch control device 17 of FIG. 3 to be piloted by the element 39 and the connection 40 so as to put the clutch out as indicated at 41. If, on the contrary, the speed of rotation of the heat-engine is higher than the idle speed, the logic is passed along the line 41 up to the element 42 which is, in fact, the element 25 of FIG. 6 and the object of which is to compare the speed of rotation of the heat-engine and the speed of rotation $w_1$ of the transmission input shaft. In the case where the speed of the heat-engine is lower than the input speed $w_1$, the vehicle is in the clutched-in phase and the method of the invention causes, through the line 44, the letting in of the clutch, the torque transmitted being a maximum, as indicated at 43. In the case, on the contrary, where the difference $w-w_1$ is positive, the logic is passed through the connection 45 up to the comparison element 46 which is, in fact, the element 22 of FIG. 6. In this element there is compared, with respect to zero, the value of the position of the accelerator pedal, detected by the sensor 11. If the driver is not depressing the accelerator pedal, the element 46 controls the clutch through the connection 47 so as to put it out as indicated at 41. In the case, on the other hand, where the driver is depressing the accelerator pedal during this phase of engaging the clutch, which has been detected by the comparison element 42, the logic is passed along the connection 48 up to the comparison element 49, which takes into consideration the speed of rotation whch corresponds with the maximum torque $w_{Cmax}$. When the speed of rotation of the heat-engine w reaches this limiting value, the element 49 transmits a signal through the connection 50 so as to pilot the torque transmitted by the clutch, as indicated at 51, in order that the speed of rotation of the heat-engine remains constant, its variation being zero as indicated at 52. Hence, the element 49 constitutes a security for the system which in the phase of engaging the clutch avoids exceeding the speed which corresponds with the maximum torque, so as to limit wear on the clutch.

In the case where the speed of rotation of the heat engine remains lower than this limit, the element 49 delivers a signal through the connection 53 to the comparison element 54, which takes into consideration the speed of rotation of the transmission output shaft $w_2$ detected by the sensor 12 of FIG. 3. In the case where this speed is positive, one is in the second period of the phase of engaging the clutch as previously explained, and the comparison element 54 delivers a signal through the connection 55 to the clutch control device 17 so as to pilot the torque transmitted, in order that the speed of rotation of the heat-engine is kept constant as indicated at 52.

In the case, on the other hand, where the speed $w_2$ is zero the element 54 delivers a signal through the connection 56 to the control device 17 so as to pilot the torque transmitted by the clutch, as indicated at 57, in order that the angular acceleration of the engine is increasing as a function of the increasing values of the displacement a of the accelerator pedal as indicated at 53. One is then, in fact, in the first period of the phase of engaging the clutch during the course of which the vehicle is still stationary.

The control of the variation of the torque transmitted by the clutch may advantageously be effected so that the variation of the torque transmitted is proportional to the deviation with respect to the desired value. One will thus have for $w < w_{Cmax}$:

$$\frac{d\,Ct}{dt} = k\left(J\frac{dw}{dt} - f(a)\right) \tag{10}$$

and for $w \geq w_{Cmax}$:

$$\frac{d\,Ct}{dt} = k \cdot J\frac{dw}{dt} \tag{11}$$

where k is a positive constant.

In this way the stability of the regulation is improved.

Thus, the present invention enables a regulation to be obtained, whatever the type of motor-drive unit visualized, which allows, in constant operation, respect for a predetermined criterion of optimalization and which, moreover, takes into account in a transient phase the wishes of the driver of the vehicle. It will be observed that certain simplifications may be visualized in the elements of the regulating device which has been described with reference to the attached Figures, depending upon the structure of the heat-engine or of the transmission visualized.

Thus, in particular, in the case where the ideal curve passes close to the point of maximum torque it is possible to choose the functions $T_1$ and $T_2$ to be equal, which represent the heat-engine feed in the clutched-in phase and in the phase of engaging the clutch.

As far as the predetermned speed for engine braking is concerned, one may be content to consider that this speed $w_j$ is solely a function of the force exerted on the brake pedal.

In the case of a heat-engine having controlled ignition, the whole of the system may be simplified by choosing as the function $T_1$ for the heat-engine feed in the phase of engaging the clutch the maximum value $T_{max}$ which is kept constant during the whole of this phase. One knows in fact that for the values of the maximum feed one really obtains an increasing driving torque for increasing values of the speed of rotation of this type of heat-engine as long as the speed of rotation remains less than or equal to the speed at maximum torque.

We claim:

1. Apparatus for regulating a motor drive unit for a motor vehicle having an accelerator pedal, a brake pedal, a heat engine with a fuel feed and a transmission with a continuously variable transmission ratio, said apparatus comprising:
- (a) first sensing means for sensing the speed of rotation w of the heat engine and generating a signal indicative thereof;
- (b) second sensing means for sensing the displacement a of the accelerator pedal and generating a signal indicative thereof;
- (c) third sensing means for sensing the speed of rotation $w_2$ of the output of the transmission and generating a signal indicative thereof;
- (d) first control means for controlling the heat engine fuel feed;
- (e) second control means for controlling the transmission ratio; and
- (f) a control unit connected to said first, second, and third sensing means for receiving the signals therefrom and including:
  - (i) memory means for storing data defining at least one function representative of the variations of the heat engine fuel feed as a function of the heat engine rotation speed w, the acceleration pedal displacement a, and data defining an ideal speed of rotation of the heat engine as a function of predetermined criteria;
  - (ii) means operative during steady operation for acting upon the heat engine fuel feed to cause the power delivered by the heat engine to tend to approach the power corresponding with the displacement a of the accelerator pedal and acting upon the transmission to cause the transmission ratio to be such that the speed of rotation w of the heat engine tends to approach an ideal speed; and
  - (iii) means operative during transient operation for acting upon the heat engine fuel feed to cause the power delivered by the heat engine to tend to approach the power corresponding with the displacement a of the accelerator pedal and thereafter acting upon the transmission without affecting the engine power to cause the ratio to be such that the speed of rotation w of the heat engine tends to approach the ideal speed.

2. Apparatus as claimed in claim 1 for regulating a motor drive unit for a motor vehicle further having a clutch between the heat engine and the transmission, said apparatus further comprising:
- (g) fourth sensing means for sensing the speed of rotation $w_1$ of the input of the transmission; and
- (h) fifth sensing means for sensing the force b exerted on the brake pedal;
and in which said control unit further includes:
  - (iv) means for determing whether the accelerator displacement a is equal to zero or greater than zero;
  - (v) means for determining whether the brake pedal force b is equal to zero or greater than zero;
  - (vi) means responsive to the comparison of the heat engine rotation speed w with the transmission input rotation speed $w_1$ for applying to said first control means a signal having a first value $T_1$ when $w-w_1>0$ and having a second value $T_2$ when $w-w_1\leq 0$, with $T_1$ being a function of a and w and increasing as a function of w, and with $T_2$ being a function of a and w such that the power of the heat engine tends to approach the power corresponding to the accelerator pedal displacement a.

3. Apparatus as claimed in claim 2 in which $T_1$ is a constant.

4. Apparatus as claimed in claim 2 in which $T_1=T_2$.

5. Apparatus as claimed in claim 2 in which $T_2$ is a function of the acceleration pedal displacement a and of an engine speed of rotation corresponding to a predetermined computed transmission ratio.

6. Apparatus as claimed in claim 1 further comprising:
- (g) fourth sensing means for sensing the speed of rotation $w_1$ of the input of the transmission; and
- (h) fifth sensing means for sensing the force b exerted on the brake pedal;
and in which said control unit further includes:
  - (iv) means responsive to the comparison of the heat engine rotational speed w with the transmission input rotational speed $w_1$ for causing the transmission ratio to be set at its lowest value $r_m$ when $w-w_1>0$;
  - (v) means for determining whether the brake pedal force b is equal to zero or greater than zero;
  - (vi) means responsive to the brake pedal force b being equal to zero for causing the transmission ratio to be set at a value $r_i$ corresponding to the ideal speed of rotation of the heat engine; and
  - (vii) means responsive to the brake pedal force b being greater than zero for causing the transmission ratio to be set at a value $r_i$ corresponding to a speed of rotation of the heat engine providing a desired engine braking.

7. Apparatus as claimed in claim 1 for regulating a motor drive unit for a motor vehicle further having a clutch between the heat engine and the transmission, said apparatus further comprising:
- (g) third control means for controlling the torque transmitted by the clutch;
and in which said control unit further includes:
  - (iv) means for determining whether the transmission output rotation speed $w_2$ is zero or greater than zero;
  - (v) means responsive to the transmission output rotational speed $w_2$ being equal to zero for acting on the clutch to control the transmitted torque in such a way that the acceleration of the heat engine increases as a function of the displacement of the accelerator pedal; and
  - (vi) means responsive to the transmission output rotational speed $w_2$ being greater than zero for acting on the clutch to control the transmitted torque in such a way that the heat engine rotational speed w remains constant.

8. Apparatus as claimed in claim 7 in which said control unit further includes:
- (vii) means responsive to the heat engine rotational speed w equaling or exceeding a preselected maximum value $w_{cmax}$ for maintaining the heat engine rotational speed w constant.

9. Apparatus as claimed in claim 7 further comprising:
- (h) fourth sensing means for sensing the speed of rotation $w_1$ of the input of the transmission;
and in which said control unit further includes:
  - (vii) means responsive to the transmission input rotational speed $w_1$ equaling or exceeding the heat engine rotational speed w for causing the clutch to be engaged so that torque is transmitted.

10. Apparatus as claimed in claim 7 in which said control unit further includes:

(vii) means responsive to the heat engine rotational speed w being less than or equal to a preselected value $w_r$, corresponding to an idle speed, for causing the clutch to be disengaged so that no torque is transmitted.

* * * * *